May 11, 1965 D. W. BRAY 3,183,449
WIDE BAND FREQUENCY DISCRIMINATOR
Filed Feb. 7, 1962 2 Sheets-Sheet 1

Inventor:
David W. Bray,
by J. T. Ready
His Agent.

May 11, 1965 D. W. BRAY 3,183,449
WIDE BAND FREQUENCY DISCRIMINATOR
Filed Feb. 7, 1962 2 Sheets-Sheet 2

Inventor:
David W. Bray,
by J. J. Ready
His Agent.

United States Patent Office
3,183,449
Patented May 11, 1965

3,183,449
WIDE BAND FREQUENCY DISCRIMINATOR
David W. Bray, South Lansing, N.Y., assignor to General
Electric Company, a corporation of New York
Filed Feb. 7, 1962, Ser. No. 172,065
6 Claims. (Cl. 329—142)

This invention relates to frequency discriminator circuits, and more particularly to a frequency discriminator circuit capable of operation with improved sensitivity over a large frequency bandwidth. These circuits are suitable for general discriminator application such as for automatic frequency control of radio transmitters, in frequency measuring instruments and for detectors in radio receivers.

Figure 1:
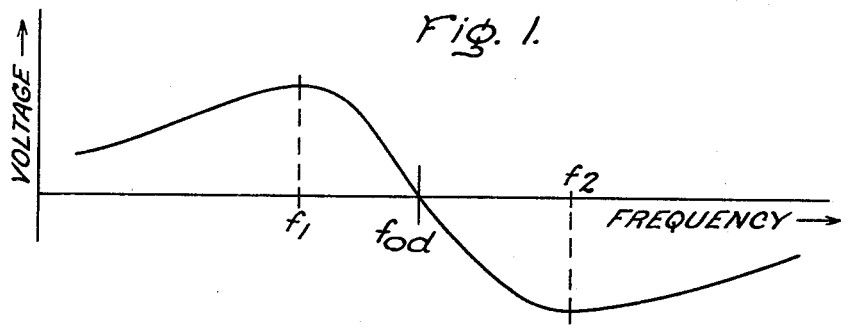

Frequency discriminator circuits have long been used to detect the frequency of radio frequency signals. In these circuits, the instantaneous amplitude of the output voltage signal is proportional to the frequency difference between the instantaneous frequency of the input signal and the center frequency of the circuit. The instantaneous polarity of the output signal reflects the instantaneous sense of the input signal frequency above or below the center frequency. These relations are illustrated in FIGURE 1 which holds qualitatively for discriminators generally.

The purpose of this invention, as is the purpose of discriminator circuits in general, is to measure the frequency of an input voltage signal. In FIGURE 1, $f_{od}$ is the center frequency of operation of the discriminator circuit and $f_1$ and $f_2$ are the lower and upper frequency voltage peaks respectively of the response curve on either side of the $f_{od}$. The frequency range between $f_1$ and $f_2$ is the range of operation of the discriminator circuit and will be referred to hereinafter as $\Delta f$, the bandwidth of the discriminator. Discriminator circuits are generally designed to have a linearly proportional relationship between the output voltage and the input signal frequency over most of the frequency range between $f_1$ and $f_2$. Practical discriminators usually provide good linearity so that the common measures of discriminator performance are the bandwidth $\Delta f$ and the ratio of differential voltage to a given differential in the frequency of the input signal. This is commonly expressed as "volts per cycle" where "cycle" is understood as being cycles per second and determines the sensitivity of the discriminator circuit.

Prior art discriminators such as the Foster-Seeley discriminator and the Travis discriminator, have generally used coupling transformers to couple the input signal to a pair of detectors. The outputs from the detectors are then combined to provide the discriminator output voltage signal. These prior art discriminators generally operate over a limited, narrow frequency bandwidth which is imposed by the operating characteristics of the input coupling transformer hereinbefore mentioned.

It is possible to increase the range of frequencies over which the prior art discriminators operate, i.e. lower the transformer circuit Q, where Q has the conventional definition $$Q = \frac{\text{resonant frequency}}{\text{frequency difference between half power frequencies}}$$

by connecting a load, such as a resistive load, to the secondary winding of the input coupling transformer. However, connecting such a load causes the output voltage per cycle to decrease. This sacrifice of sensitivity to increase bandwidth is undesirable for many applications. Other undesirable effects, such as variations in mutual inductance in the Foster-Seeley circuit, are obtained when an attempt is made to operate prior art discriminators over a large frequency bandwidth. Some of these other undesirable effects are discussed in R. V. Pound, Microwave Mixers, McGraw-Hill Book Company, Inc., 1948, pp. 302–312. In many applications it is desirable to use a frequency discriminator which operates over a large frequency bandwidth and in which the ratio of output voltage to frequency deviation from the center frequency is large.

Accordingly, an object of the invention is to provide a frequency discriminator circuit in which either the bandwidth or the output voltage per cycle of input signal can be increased over that obtainable with prior art discriminators employing coupling transformers.

A further object of the invention is to provide a frequency discriminator which avoids the use of coupling transformers and thereby obviates the disadvantages of coupling transformers explained above.

In accordance with this invention there is provided a frequency discriminator circuit having a low Q, wideband operation and producing an output voltage signal which has a high value of volts per cycle. The invention employs in the input circuitry a pair of impedance transformation networks for coupling the input voltage signal to detectors. The use of these networks permits wideband frequency operation of the discriminator and also provides a voltage gain into the circuit to produce an output voltage of the discriminator which has a high value of volts per cycle.

Figure 2:
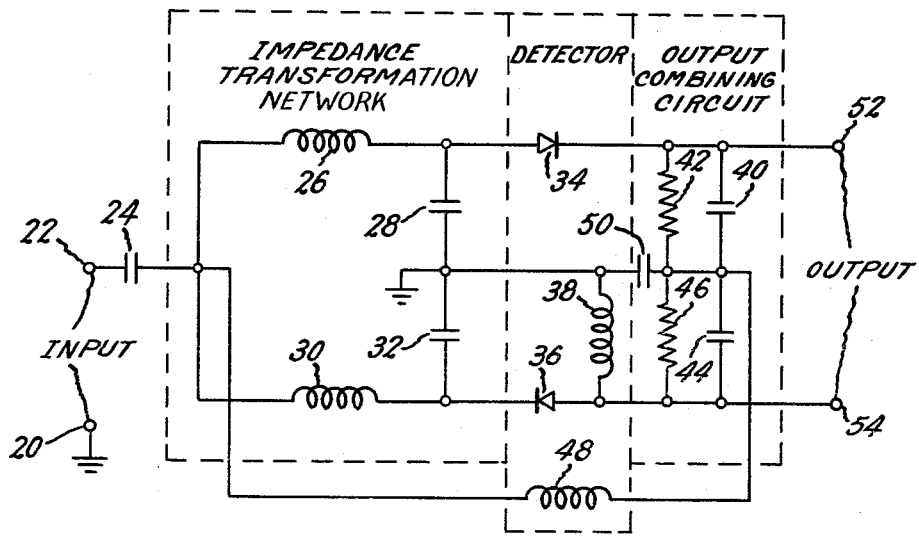
Figure 3:
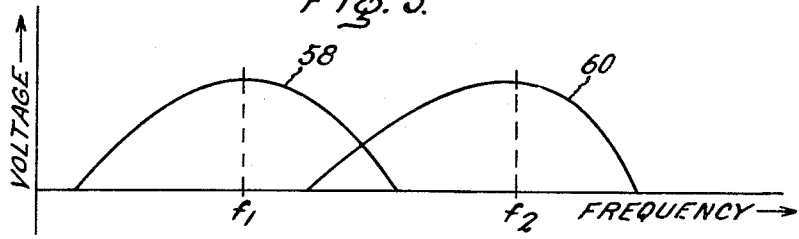
Figure 4:
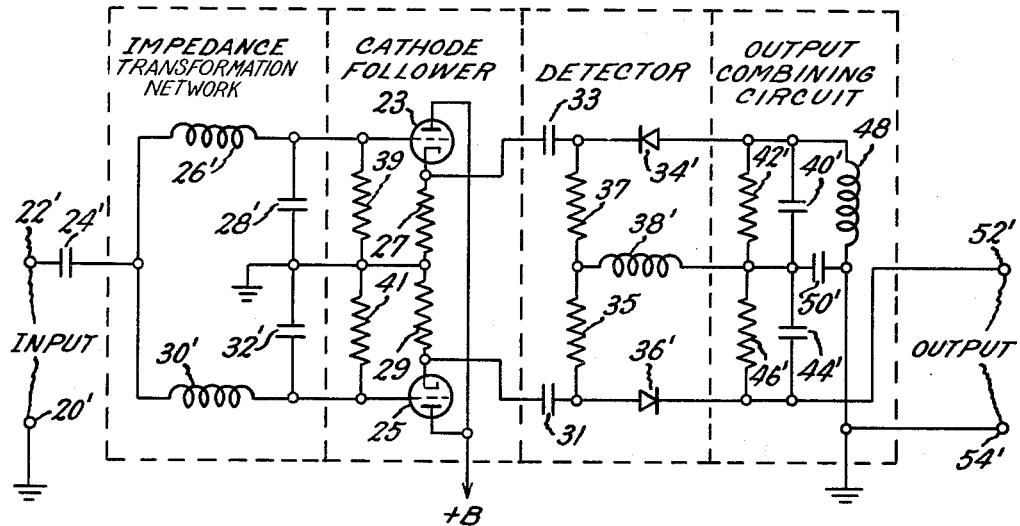
Figure 5:
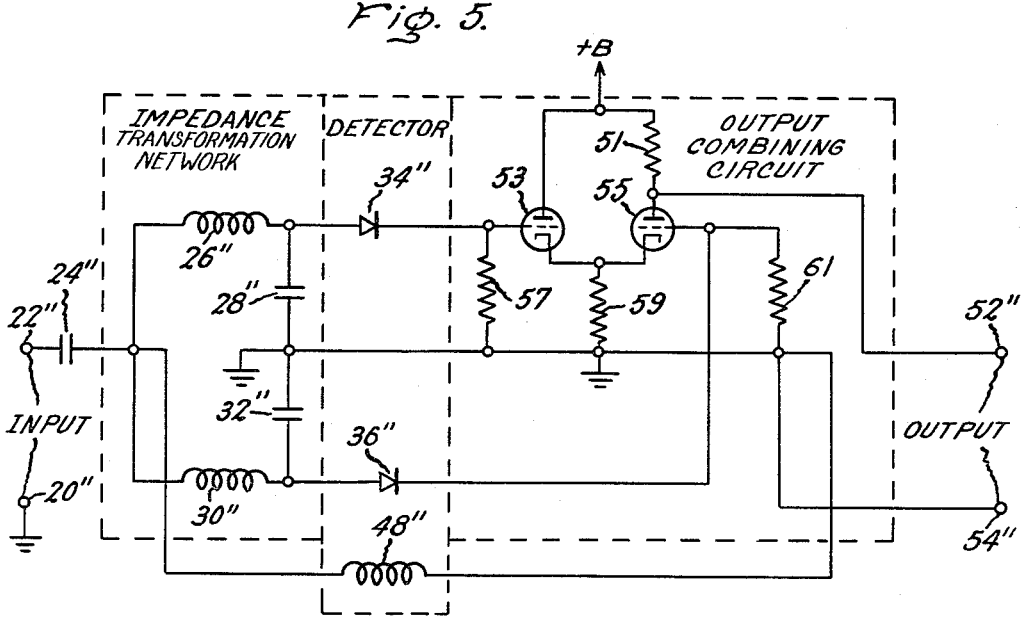

The invention, together with further objects and advantages thereof, may best be understood by referring to the following description taken in conjunction with the appended drawings in which like numerals indicate like parts and in which:

FIGURE 1 is a typical frequency response curve for a frequency discriminator;
FIGURE 2 is a schematic diagram of one embodiment of the invention;
FIGURE 3 is a set of frequency response curves for a pair of impedance transformation networks of the invention;
FIGURE 4 is a schematic diagram of a second embodiment of the invention; and
FIGURE 5 is a schematic diagram of a third embodiment of the invention.

For purposes of the discussion of the principles of operation of the invention, reference will be made to operation in the R.-F. region. It is realized, however, that the invention is not limited to operation in this frequency range. The invention functions in any frequency range from audio to 200 to 300 megacycles, which, in the present state of the art, is the frequency limit of operation of the lumped constant circuit elements in the input impedance transformation networks.

Referring now to the drawings and more particularly to FIGURE 2 there is shown therein a first impedance transformation network comprised of an inductor 26 and a capacitor 28 serially connected with a capacitor 24 across a pair of input terminals 20 and 22, terminal 20 being referenced to ground. A second impedance transformation network comprising an inductor 30 and a capacitor 32 is also connected serially with capacitor 24 across input terminals 20 and 22. The output terminals of the first and second impedance transformation networks are connected respectively to detecting devices 34 and 36. The output of detecting device 34 is applied across a resistor 42 and thence to an output terminal 52. A capacitor 40 is connected in parallel with resistor 42. In a similar manner the output from the second detecting device 36 is applied across a resistor 46 and thence to output terminal 52. A capacitor 44 is connected in parallel with resistor 46. A radio frequency choke 38 is connected between ground and a second output terminal 54 which provides a D.-C. reference to ground for the combining network. A capacitor 50 is connected between the junction of resistors 42 and 46 and ground to function as a radio frequency bypass together with capacitor 40 for the output from the first detecting device 34, together with capacitor 44 as a radio frequency by-pass for the output from the second detecting device 36. A second radio frequency choke 48 is connected between the junction of resistors 42 and 46 and the junction of the two L-matching, impedance transformation networks.

To analyze the operation of the circuit of FIGURE 2, it is convenient to divide it into three parts: the input circuitry which comprises the impedance transformation networks; the detecting devices; and the output circuitry which combines the outputs from the detecting devices and provides the output voltage signal.

The coupling capacitor 24 couples the input signal to the two impedance transformation, L-matching networks. The first L-matching network, comprised of inductor 26 and capacitor 28, has a response curve such as that shown in 58 in FIGURE 3; and as shown is tuned to resonate at a frequency $f_1$.

The Q of this first L-matching network is adjusted to be approximately equal to the desired frequency bandwidth of the discriminator or $\Delta f$. An output voltage signal is obtained from this first L-matching network if the input frequency falls within the frequency region of its response, and said output voltage signal is applied to a first detecting device 34. The second impedance transformation, L-matching network is comprised of an inductor 30 and a capacitor 32. This second impedance transformation network has a frequency response such as is shown as 60 in FIGURE 3; and, as shown is tuned to resonate at a frequency $f_2$. This L-matching network is also made to have a Q adjusted to be approximately equal to the desired frequency bandwidth $\Delta f$. If the frequency of the input signal is within the operating region of this second L-matching network an output voltage signal is obtained from the network and is applied to a second detecting device 36 in FIGURE 1. These first and second impedance transformation networks perform the function of tuned circuits and thereby provide impedance matches to the detecting devices 34 and 36. Since the ratio of the output impedance to the input impedance of each of the L-matching networks is greater than one, a voltage gain into the detecting devices is obtained.

The remaining two portions of the circuit of FIGURE 2, the detecting devices and the output circuitry, are conventional in the frequency discriminator art. The output from the first impedance transformation network is detected in a detecting device 34 which may be a conventional diode detector such as a tube or a semi-conductor diode or any detector such as is used in the electronics art. The detected signal is then applied across an output resistor 42. Capacitors 40 and 50 provide an R.-F. by-pass path to ground. In a similar fashion the output from the second impedance transformation network is detected in a detecting device 36, which may be conventional detector similar to detection device 34; and the detected signal is applied across an output resistor 46. Capacitors 44 and 50 provide an R.-F. bypass path to ground. Radio frequency choke 38 completes the D.-C. path for detecting devices 34 and 36. The output voltage from detector 36 is reversed in polarity with respect to the output voltage from detector 34 because detector 36 is connected in the circuit in a reverse manner with respect to the manner in which detector 34 is connected. As a result, the second half of the discriminator response curve, which is the same as that shown in FIGURE 1, is negative.

It is to be noted that the operation of the invention is not limited to the use of L-matching type impedance transformation networks. In operation the circuit would function with any impedance transformation networks in the family which comprises L, $\pi$, T or lattice networks coupling the input signal to the discriminator to the detecting devices 34 and 36. Those skilled in the electronics circuitry art will realize that several options are available to the designer in selecting impedance transformation networks.

One procedure in the design of a discriminator circuit having a specific Q is to first select the Q of the impedance transformation networks and design the networks. The remainder of the circuit is then designed correspondingly. Thus, it is possible to design the discriminator circuit to operate over any frequency bandwidth. Equipment having wide range of frequencies such as a $\Delta f=15$ megacycles at a center frequency $f_{0d}=30$ megacycles has been built in a circuit which provides a high ratio of volts per cycle output.

Consider now, as an example for the purpose of this discussion, a discriminator for operation at a center frequency $f_{0d}$ of 30 megacycles (mc.). Prior art discriminators have a response, such as that shown in FIGURE 1, of $\Delta f=2$ megacycles, or $f_1=29$ mc. and $f_2=31$ mc., if a high volts per cycle operation is obtained. Utilizing the present invention, the response of a discriminator having $f_{0d}=30$ mc. and maintaining a high volts per cycle output would be, for example, $\Delta f=15$ mc. or $f_1=22$ mc. and $f_2=37$ mc. Employing impedance transformation networks to couple the input signal into the circuit provides a voltage gain into the circuit. Use of these networks for a given input signal provides approximately twice the voltage available when a transformer coupled input is used. This will be apparent from consideration of the following two derivations, one of which shows the ratio of voltage output to voltage input for a transformer coupled voltage signal and the other of which shows the ratio of voltage output to voltage input for an impedance transformation network coupled voltage signal.

It has been shown for transformer coupling (i.e. C. B. Aiken, "Two Mesh Tuned Coupled-Circuit Filters," Proc. I.R.E., 25, No. 2, February 1937, and G. E. Valley et al., Vacuum Tube Amplifiers, McGraw-Hill Book Company, Inc., 1948, pp. 202–203), that if $f_0$=the midband frequency of the transformer $\omega_0=2\pi f_0$ $R_1$=primary, input resistance $R_2$=secondary, output resistance $E_{out}$=secondary, output voltage $I_{in}$=primary, input current $k=\dfrac{M}{\sqrt{L_1 L_2}}$, the coefficient of coupling $Q_1=Q$ of primary of transformer $Q_2=Q$ of secondary of transformer $s=k\sqrt{Q_1 Q_2}$, the coupling index $v=\sqrt{Q_1 Q_2}(\omega/\omega_0-\omega_0/\omega)$, the frequency variable $\rho=Q_1/Q_2$, the Q ratio $b=\rho+\dfrac{1}{\rho}=\dfrac{Q_1}{Q_2}+\dfrac{Q_2}{Q_1}$ then $$\frac{E_{out}}{I_{in}}=\frac{s\sqrt{R_1 R_2}}{\left[(1+s^2)^2-2\left(s^2-\dfrac{b}{2}\right)v^2+v^4\right]^{1/2}} \quad (1)$$

Since the circuit is tuned to resonance $\omega=\omega_0$ $\therefore \dfrac{\omega}{\omega_0}-\dfrac{\omega_0}{\omega}=0$ or $v=0$ Then Equation 1 reduces to $$\frac{E_{out}}{I_{in}} = \frac{s\sqrt{R_1 R_2}}{(1+s^2)} \quad (2)$$

Since operation is at resonance $$I_{in} = \frac{E_{in}}{R_1}$$

and Equation 2 becomes $$\frac{E_{out}}{\frac{E_{in}}{R}} = \frac{s\sqrt{R_1 R_2}}{(1+s^2)}$$

or $$\frac{E_{out}}{E_{in}} = \frac{s\sqrt{R_1 R_2}}{R_1(1+s^2)} \quad (3)$$

If the circuit is critically coupled, i.e. if $s=1$, Equation 3 reduces to $$\frac{E_{out}}{E_{in}} = \frac{1}{2}\sqrt{\frac{R_2}{R_1}} \quad (4)$$

The ratio of similar voltages for an impedance transformation network coupling develop as follows:

Let $E_{in}$ = input voltage $E_{out}$ = output voltage $R_1$ = resistance appearing at the input terminals $R_2$ = resistance appearing at the output terminals.

The network is tuned to resonance at the frequency of the incoming signal. Since there is direct coupling between the input and the output, there is essentially no power loss in the circuit. Therefore $$P_{in} = P_{out} \quad (5)$$

By definition $$P_{in} = \frac{E_{in}^2}{R_1} \quad (6)$$

and $$P_{out} = \frac{E_{out}^2}{R_2} \quad (7)$$

Substituting Equations 6 and 7 into 5 results in $$\frac{E_{out}}{E_{in}} = \sqrt{\frac{R_2}{R_1}} \quad (8)$$

A comparison of Equations 4 and 8 shows that, for a given input voltage, the impedance transformation network coupling provides an output voltage which is twice the output voltage of the transformer coupling. Thus this invention makes possible discriminator circuit operation at a higher ratio of volts per cycle than is obtainable with transformer coupling in the discriminator input circuitry.

Reference is now made to FIGURE 4 wherein there is illustrated a schematic diagram of a second embodiment of the invention. The circuit of FIGURE 4 is similar to the embodiment of the invention shown in FIGURE 2 wherein the same components are designated by the same reference characters with primes. The fundamental difference between the two is the addition of a pair of cathode followers, each of which functions as an impedance match between one of the input impedance transformation networks and one of the detecting devices 34′ or 36′, in the circuitry of FIGURE 4. A first cathode follower 23 having a grid resistor 39 and a cathode resistor 27 accepts the output from the first impedance transformation network comprised of inductor 26′ and capacitor 28′ and supplies an output voltage signal which is coupled by coupling capacitor 33 to a detecting device 34′. Resistor 37 is connected to complete the D.-C. path for detecting device 34′. The cathode follower provides a low output impedance to drive the detecting device 34′. Providing this additional impedance match allows the resistance value of resistor 42′ in the output circuitry to be independent of the value of the voltage step up ratio of the input impedance transformation network. In a similar manner a second cathode follower 25 having a grid resistor 41 and a cathode resistor 29 provides the impedance match, with the same attendant advantages as that obtained with cathode follower 23, between the second input impedance transformation network comprised of inductor 30′ and capacitor 32′ and the output combining circuitry including detecting device 36′ and combining resistor 46′. Capacitor 31 is a coupling capacitor, and resistor 35 is connected to complete the D.-C. path for detecting device 36′.

It will be understood by those skilled in the art of electronic circuitry that transistor circuits could be used to provide the impedance matches achieved by the cathode followers 23 and 25 of FIGURE 4. Such circuits are some times known as emitter followers in the transistor art. For the present purpose, "cathode follower" is to be considered generic to vacuum tube circuits and their equivalents.

Referring now to FIGURE 5, there is illustrated a third embodiment of the invention in which two parts of the discriminator circuit are the same as two parts of the circuit shown in the embodiments of FIGURES 1 and 4. Accordingly, the same components are designated by the same reference characters with double primes. One identical part is the input circuitry comprising inductor 26″ and capacitor 28″ connected to form a first impedance transformation network and inductor 30″ and capacitor 32″ connected to form a second impedance transformation network. The second identical portion of the circuitry is comprised of detecting devices 34″ and 36″. Differences between the embodiment of FIGURE 5 and the embodiments of FIGURES 2 and 4 are essentially in the combining and impedance matching circuitry. As shown in FIGURE 5, a difference amplifier comprised of vacuum tubes 53 and 55 having grid resistors 57 and 61, respectively, and a common cathode resistor 59 accept as input voltage signals the detected voltage output signals from detecting devices 34″ and 36″. The difference amplifier circuit is conventional and is well known to those skilled in the electronics circuitry art. The polarity of diode 36″ is reversed relative to the FIGURE 2 arrangement to provide signals for comparison in the difference amplifier. An output voltage signal, which is the algebraic difference between the input voltage signals, is applied to output terminals 52 and 54. The advantage of the difference amplifier lies in its fast rise time which provides a combining network having a fast response time.

Another possible variation of the invention is the employment of full wave bridge type detecting devices instead of the halfwave detectors 34 and 36 of FIGURES 1, 4 and 5.

The embodiments of the invention illustrated herein show some of the ways for implementing the invention; i.e. the utilization of impedance transformation networks to couple the input signal into a discriminator circuit. Those skilled in the art of discriminator circuitry will recognize the numerous other signal combining circuitry, detection circuitry, and output circuitry arrangements and methods are available to the circuit designer.

The invention is not limited to the embodiments described herein. The scope of the invention as desired to be protected is set forth in the appended claims.

What is claimed is:

1. A frequency discriminator circuit responsive to input signal frequency variations about a center frequency comprising:

(a) a first impedance matching network coupled in series with an input signal and tuned above the center frequency with a frequency differential approximately equal to or greater than half the center frequency and having a Q approximately equal to the center frequency;
(b) a second impedance matching network similar to said first network coupled in series with said input signal and in parallel with said first network and tuned below the center frequency with a frequency differential approximately equal to or greater than half the center frequency and having a Q approximately equal to the center frequency;
(c) first detector means coupled to said first impedance matching network for providing an instantaneous D.-C. voltage proportional to the instantaneous A.-C. voltage produced in said first network;
(d) second detector means coupled to said second impedance matching network for providing an instantaneous D.-C. voltage proportional to the instantaneous A.-C. voltage produced in said second network;
(e) output combining means coupled to said first and second detector means to provide an output signal in accordance with the instantaneous difference in said D.-C. voltages;
(f) said impedance matching networks having an output impedance to input impedance ratio exceeding one whereby a voltage gain into the detecting devices is obtained; and
(g) said impedance matching networks being tuned so as to provide substantially linear volts per cycle response about the center frequency over a frequency bandwidth of the same order as the center frequency itself.

2. The frequency discriminator circuit of claim 1 further comprising:
(f) cathode follower means coupled between said impedance matching networks and said detector means providing a high impedance load for said networks and a low impedance source for said detector means.

3. The frequency discriminator circuit of claim 1 wherein:
(f) said output combining means is comprised of a differential amplifier coupled to the output of said detector means.

4. A frequency discriminator circuit responsive to input signal frequency variations about a center frequency comprising:
(a) a first L-matching network coupled in series with an input signal and tuned to series resonance above the center frequency;
(b) a second L-matching network similar to said first network coupled in series with said input signal and in parallel with said first network and tuned to series resonance below the center frequency;
(c) first detector means coupled to said first L-matching network for providing an instantaneous D.-C. voltage proportional to the instantaneous A.-C. voltage produced in said first network;
(d) second detector means coupled to said second L-matching network for providing an instantaneous D.-C. voltage proportional to the instantaneous A.-C. voltage produced in said second network; and
(e) output combining means coupled to said first and second detector means to provide an output signal in accordance with the instantaneous difference in said D.-C. voltages; and
(f) said L-matching networks having an output impedance to input impedance ratio exceeding one whereby a voltage gain into the detecting devices is obtained; and
(g) said L-matching networks being tuned so as to provide substantially linear volts per cycle response about the center frequency over a frequency bandwidth of the same order as the center frequency itself.

5. The frequency discriminator circuit of claim 4 further comprising:
(f) cathode follower means coupled between said L-matching networks and said detector means providing a high impedance load for said networks and a low impedance source for said detector means.

6. The frequency discriminator circuit of claim 4 wherein:
(f) said output combining means is comprised of a differential amplifier coupled to the output of said detector means.

References Cited by the Examiner
UNITED STATES PATENTS

| | | | |
|---|---|---|---|
| 2,361,625 | 10/44 | Hansell | 329—142 X |
| 2,361,634 | 10/44 | Koch | 329—140 X |
| 3,076,940 | 2/63 | Davis et al. | 329—142 X |

FOREIGN PATENTS 821,484  10/59  Great Britain.

ROY LAKE, *Primary Examiner.*